United States Patent Office 3,268,466
Patented August 23, 1966

3,268,466
COLD-HARDENING FOUNDRY MIXTURE COMPRISING AN EPOXY RESIN AND FURFURYL ALCOHOL AS A CATALYST
Wolfgang Simm, Lausanne, Switzerland, assignor to Sulzer Brothers Limited, Winterthur, Switzerland, a Swiss company
No Drawing. Filed Mar. 26, 1963, Ser. No. 267,918
Claims priority, application Switzerland, Mar. 30, 1962,
3,852/62, 3,853/62
5 Claims. (Cl. 260—29.2)

The present invention relates to foundry molding materials used for casting metals and more particularly to foundry molding materials incorporating specific cold-hardening binders.

The necessity of automating and speeding up operations in foundries, for example, and the necessity of making better use of production facilities has created a need for foundry-molding mixtures incorporating cold-hardening binders.

There are a number of cold-hardening binders presently employed in foundry molding mixtures. Each of these possess certain disadvantages. For example, certain self-drying oils have been employed. They produce however a mold that requires long drying periods, especially when access of air thereto is prevented. Synthetic resins based on urea which have also been developed for use as binders have been found to possess very low breakdown temperatures which, in turn, limits the versatility of the resulting mold. Sand mixtures containing acid-cured resins on a furane basis (another but relatively new cold-hardening binder) also possess certain limiting characteristics. For example, they tend to cause sticking of the mold to the casting, and the evolution of gases which normally attends the pouring of the molten metal into molds becomes very pronounced and turbulent.

According to the present invention, cold-hardening mixtures of broad versatility are formed by using binders having at least one ethoxyline resin of diphenyl-methane or diphenol derivatives to which is added, as a hardener, at least one organic compound containing a plurality of reactive amine groups.

Very good results are obtained when the ethoxyline resins are synthesized from para-substituted diphenyl-methane derivatives, and particularly from bisphenol A or bis(para-methylaminophenyl)methane, especially when their epoxide equivalent is over 170.

Among the organic compounds that may be used as a hardener, those having a plurality of reactive amino groups and especially a polymer (linear or circular) of two to five =N—CH$_2$—CH$_2$— groups whose CH$_2$ end positions are occupied by the amine groups have been found to be well suited for the purpose. Excellent results are obtained particularly with n-aminoethylpiperazine.

Although with conventional epoxy-resin mixes it is frequently found that as the proportion of filler is increased the curing rate drops considerably, epoxy-resin mixes prepared according to the teachings of the present invention will cure rapidly at room temperature even with high filler loading volumes of about 99%. Furthermore, the compressive strengths of these mixtures, even after several hours is considerably above 50 kg./cm.$^2$ at room temperature. In order to use such a high a proportion of filler, however, fillers having particles of relatively small surface area such as pure quartz sand, fire clay, or similar filler materials are chosen.

It has unexpectedly been found, for example, that with the resin-hardner blends of the present invention, the proportion of binder required for a pure quartz sand having the sieve analysis

| Particle size (mm.): Under— | Percent of total |
|---|---|
| 0.1 | 1 |
| 0.2 | 10 |
| 0.3 | 50–55 |
| 0.4 | 90 |
| 0.5 | 96 |
| 0.6 | 98 |
| 0.8 | 100 | and a surface area of 125 to 135 cm.$^2$/g. (as determined, for example, by the method described in the article by Franz Hofmann entitled, "Method of Determining the Specific Surface, the Particle Shape, and the Particle Structure of Foundry Sands," at pages 49–56 of Giesserei, vol. 47, No. 3, February 11, 1960) can be reduced from the 2 to 3% by weight of sand normally required with commercial binders to less than 2% and in some cases to less than 1.5%; and when these resulting mixtures are compared with sand mixtures prepared with the commercial binders even when such commercial binders are hardened by the application of heat, no appreciable loss of strength will be found. This is surprising when it is noted that the heat released during the hardening, which otherwise would have an accelerating effect, is absorbed almost completely by filler contents of 98% and above, and thus is not available for the hardening process.

If particularly rapid hardening is desired, organic compounds containing polar hydroxyl groups, such as phenol, gylcerol, cresol, vanillin, salicylic acid and glycol, even in the form of polymers or condensates, may be incorporated as accelerators. Good green compressive strengths of the order of 10 kg./cm.$^2$ are then obtained even after 1 to 3 hours. Particularly well suited for this purpose are furfuryl alcohol and tris(dimethylamino-methyl)phenol or triethanolamine.

In making the casting molds, the various ingredients of the binder may be mixed with the sand either simultaneously or, with best results, separately and successively. Alternatively, the hardener and accelerator or the resin and accelerator may be mixed in advance to form stable premixes. This latter procedure offers the substantial advantage that only two stable ingredients need to be measured in preparing the sand mixture, and the usual premixing of the binder, which is a nuisance particularly when large quantities are involved, can be dispensed with.

According to the teachings of the present invention, the proportions of resin, hardener and accelerator may be varied. However, to assure optimum results, the equivalent of the free nitrogen valences of the organic compound containing the amine groups is preferably maintained to within ±10% of the epoxide equivalent of the resin employed, and the proportion of the accelerator is preferably held below that of the hardener.

In some situations it may be desirable in producing the molding mixture, employing a selected set of proportions for the resin, hardener, accelerator and filler, to obtain a lengthening of the time during which the mixture can be worked. This may be achieved by adding water to the filler in amounts up to 5% by weight of dry filler although amounts up to 2% are preferred. In this manner it is possible to achieve a lengthening of the time during which the mixture is workable without entailing an equal lengthening of the hardening time, as is usually required by conventional methods.

Unlike acid-curing binder systems, the binders of the present invention make it possible to satisfactorily work even alkali sands, such as are frequently reclaimed in a foundry. Zirconium, olivine and coal sands, etc., also become well suited for this purpose, excellent results being obtained with as little as 1% of binder by weight of filler, as will be more fully described below in the examples. Amounts of binder of such a low order are highly advantageous in that even the most complex castings will not present any defects due to excessively high or excessively turbulent gas evolution, and core collapsibility is so good that clean-up costs are reduced to a minimum.

Very good binders are obtained with blends of the ingredients ethoxyline resin, aminoethylpiperazine, furfuryl alcohol and tris (dimethylaminomethyl) phenol within the following ranges:

60 to 80% liquid ethoxyline resin having an epoxide equivalent of over 170,
10 to 20% n-aminoethylpiperazine,
10 to 20% furfuryl alcohol, and
0 to 10% tris (dimethylaminomethyl) phenol.

Example 1 given below illustrates the solidification behavior of a binder for a mixture prepared according to the teachings of the present invention.

Example 1

64 g. of bisphenol-A epoxy resin is mixed with 12 g. of furfuryl alcohol, 16 g. of n-aminoethylpiperazine and 4 g. of tris (dimethylaminomethyl) phenol. This mixture remains fully liquid for about 5 minutes but after 10 minutes it is completely solidified.

The examples which follow demonstrate the excellent properties of foundry molding mixtures prepared by the new method:

Example 2

The foundry molding mixture is composed of 240 kg. of pure quartz sand of the sieve analysis given earlier having a surface area of about 130 cm.$^2$/g., 1.84 kg. of liquid bisphenol-A epoxy resin having an epoxide equivalent of about 200, 0.4 kg. of aminoethylpiperazine, and 0.16 kg. of furfuryl alcohol. Test pieces in the form of circular cylinders 30 mm. in diameter and 50 mm. high made from this foundry molding mixture at room temperature of about 72° F. have compressive strengths of 20.2 kg./cm.$^2$ after 5 hours, and
51 kg./cm.$^2$ after 24 hours.

The total binder content is 1%. The edges and surfaces of the test pieces are smooth and hard.

Example 3

The foundry-molding mixture is composed of 200 kg. of quartz sand as used in Example 2, 1.8 kg. of bisphenol-A epoxy resin, 0.4 kg. of aminoethylpiperazine, 0.2 kg. of furfuryl alcohol, and 0.2 kg. of DMP 30 (2-4-6-tri [dimethylaminomethyl] phenol). Test pieces in the form of circular cylinders 30 mm. in diameter and 50 mm. high made from this foundry molding mixture at room temperature have compressive strengths of 12 kg./cm.$^2$ after 1¾ hours,
27.5 kg./cm.$^2$ after 2¼ hours,
43 kg./cm.$^2$ after 3¼ hours, and
67 kg./cm.$^2$ after 24 hours.

The total binder content is 1.2%. The edges and surfaces of the test pieces are smooth and hard.

Example 4

The foundry molding mixture is composed of 200 kg. of quartz sand of the sieve analysis given earlier, 2.96 kg. of bis (para-methylaminophenyl) methane epoxy resin having an epoxide equivalent of about 200, and 1.04 kg. of aminoethylpiperazine. Test pieces in the form of circular cylinders 30 mm. in diameter and 50 mm. high made from this foundry molding mixture at room temperature have compressive strengths of 56 kg./cm.$^2$ after 5 hours and
102 kg./cm.$^2$ after 70 hours.

The total binder content is 2%. The edges and surfaces of the test pieces are smooth and hard.

Example 5

The foundry molding mixture is composed of 200 kg. of quartz sand of the sieve analysis given earlier, 1.85 kg. of bisphenol-A epoxy resin having an expoxide equivalent of about 200, 0.07 kg. of glycol, 0.3 kg. of phenol, and 0.36 kg. of aminoethylpiperazine. Test pieces in the form of circular cylinders 30 mm. in diameter and 50 mm. high made from this foundry molding mixture at room temperature have compressive strengths of 1.35 kg./cm.$^2$ after 3 hours,
11.5 kg./cm.$^2$ after 5½ hours, and
47 kg./cm.$^2$ after 21 hours.

The total binder content is 1.2%. The edges and surfaces of the test pieces are smooth and hard.

Example 6

The foundry molding mixture is composed of 200 kg. of quartz sand of the sieve analysis given earlier, 2.25 kg. of bisphenol-A resin having an epoxide equivalent of about 200, 0.25 kg. of furfuryl alcohol, 0.25 kg. of tris (dimethylaminoethyl) phenol, and 0.25 kg. of triethylene tetramine. Test pieces in the form of circular cylinders 30 mm. in diameter and 50 mm. high made from this foundry molding mixture at room temperature have compressive strengths of 14.1 kg./cm.$^2$ after 1 hour and 55 minutes,
70.7 kg./cm.$^2$ after 3 hours and 50 minutes, and
91.2 kg./cm.$^2$ after 24 hours.

The total binder content is 1.5%. The edges and surfaces of the test pieces are smooth and hard.

Example 7

The foundry molding mixture is composed of 200 kg. of quartz sand of the sieve analysis given earlier, 2.25 kg. of bisphenol-A resin having an epoxide equivalent of about 200, 0.25 kg. of furfuryl alcohol, 0.187 kg. of tris (dimethylaminomethyl) phenol, and 0.313 kg. of diethylene triamine. Test pieces in the form of circular cylinders 30 mm. in diameter and 50 mm. high made from this foundry molding mixture at room temperature have compressive strengths of 23.4 kg./cm.$^2$ after 2 hours 20 minutes, and
117 kg./cm.$^2$ after 24 hours.

The total binder content is 1.5%. The edges and surfaces of the test pieces are smooth and hard.

Example 8

The foundery molding mixture is composed of 200 kg. of quartz sand of the sieve analysis given earlier, 2.4 kg. of epoxy resin, available commercially under the trade name Epicote 828, and 0.6 kg. of aminoethylpiperazine. Epicote 828 is a reaction product of bisphenol A and epichlorohydrin. Test pieces in the form of circular cylinders 30 mm. in diameter and 50 mm. high made from this foundry molding mixture begin to harden after 30 minutes when treated to 60° C. and after 4 hours oven treatment at that temperature have a compressive strength of 38 kg./cm.$^2$.

Example 9

The foundry molding mixture is composed of 200 kg. of quartz sand of the sieve analysis given earlier, 1.8 kg. of bisphenol-A epoxy resin, 0.4 kg. aminoethylpiperazine, 0.2 kg. of furfuryl alcohol, and 0.5 kg. tris (dimethylaminomethyl) phenol (DMP–30). Test pieces in the form of circular cylinders 30 mm. in diameter and 50 mm. high made from this foundry molding mixture at room temperature achieve in 2½ hours to 3 hours an average comprehensive strength of 10 kg./cm.$^2$. After 24 hours such strengths are approximately 80 kg./cm.$^2$, and the time within which such a mixture can be satisfactorily worked is about 30 minutes.

If in contrast, the quartz sand is moistened to about 0.7% moisture, the working time is approximately doubled to something like an hour, whereas the hardening time increases only some 30% until a hardness of 10 kg./cm.$^2$ is reached. With conventional methods, an approximately equal lengthening of the hardener time would be encountered, implying a hardening time of 6 hours. The method of adding water has the advantage of substantially shortening the curing time of the filled molds.

Molds and cores made of the new cold-hardening foundry molding mixture have practically indefinite storage lives. They are dimensionally accurate, evolve little gas in pouring, and collapse readily without leaving deleterious residues in the sand.

The above description includes examples of preferred binders and mixtures; however, it is apparent that various changes, including the use of other mold material such as fire clay and the hardening of the mixtures at temperatures above room temperature, may be made without departing from the scope of the invention as set forth in the following claims.

I claim:

1. A method for preparing a cold-hardening foundry mold which comprises mixing a filler and a resinous binder to form a molding mixture, said binder comprising 60% to 80% by weight of an epoxy resin having an epoxy equivalent more than about 170, 10% to 20% by weight of an organic amine having the linkage =N—CH$_2$CH$_2$, whose CH$_2$ end positions are occupied by the amine group, and 10% to 20% by weight of an accelerator selected from the group consisting of furfuryl alcohol and its liquid polymer, the amount of said binder in the mixture being in the range between 1% and 2% by weight of said filler, forming a mold from said mixture and curing it.

2. A method for preparing a cold-hardening foundry mold which comprises mixing sand having a surface area in the range from 125 to 135 cm.$^2$/g. and a resinous binder to form a molding mixture, said binder comprising 60% to 80% by weight of an epoxy resin having an epoxy equivalent more than about 170, 10% to 20% by weight of an organic amine having the linkage =N—CH$_2$CH$_2$, whose CH$_2$ end positions are occupied by the amine group, and 10% to 20% by weight of an accelerator selected from the group consisting of furfuryl alcohol and its liquid polymer, the amount of said binder in the mixture being in the range between 1% and 2% by weight of said filler, forming a mold from said mixture, and curing the resultant mold at room temperature.

3. A method for preparing a cold-hardening foundry mold which comprises mixing a filler, a resinous binder and water to form a molding mixture, said binder comprising 60% to 80% by weight of an epoxy resin having an epoxy equivalent more than about 170, 10% to 20% by weight of an organic amine having the linkage =N—CH$_2$CH$_2$, whose CH$_2$ end positions are occupied by the amine group, and 10% to 20% by weight of an accelerator selected from the group consisting of furfuryl alcohol and its liquid polymer, the amount of said binder in the mixture being in the range between 1% and 2% by weight of said filler and the amount of water in the mixture being in the range between about 2% and 5% by weight of said filler, forming a mold from said mixture, and curing the resultant mold at room temperature.

4. A method for preparing a cold-hardening foundry mold which comprises mixing a filler and a resinous binder to form a molding mixture, said binder comprising 60% to 80% by weight of an epoxy resin synthesized from a parasubstituted diphenyl-methane derivative selected from the group consisting of bisphenol A and bis(para-methylaminophenyl) methane and having an epoxy equivalent more than about 170, 10% to 20% by weight of an organic amine having the linkage =N—CH$_2$CH$_2$, whose CH$_2$ end positions are occupied by the amine group, and 10% to 20% by weight of an accelerator selected from the group consisting of furfuryl alcohol and its liquid polymer, the amount of said binder in the mixture being in the range between 1% and 2% by weight of said filler, forming a mold from said mixture, and curing the resultant mold at room temperature.

5. A method for preparing a cold-hardening foundry mold which comprises mixing sand having a surface area in the range from 125 to 135 cm.$^2$/g., a resinous binder and water to form a molding mixture, said binder comprising 60% to 80% by weight of an epoxy resin having an epoxy equivalent more than about 170, 10% to 20% by weight of N-aminoethylpiperazine, 10% to 20% by weight of an accelerator selected from the group consisting of furfuryl alcohol and its liquid polymer, and 0 to 10% by weight of tris (dimethylaminomethyl) phenol, the amount of said binder in the mixture being in the range between 1% and 2% by weight of said filler and the amount of water in the mixture being up to about 5% by weight of said filler, forming a mold from said mixture, and curing the resultant mold at room temperature.

References Cited by the Examiner

UNITED STATES PATENTS

| 1,777,998 | 10/1930 | Dent et al. | |
| 2,510,885 | 6/1950 | Greenlee | 260—47 |
| 3,008,205 | 11/1961 | Blaies | 260—37 |
| 3,018,264 | 1/1962 | Colclough | 260—37 |

OTHER REFERENCES

Shechter et al., Glycidyl Ether Reactions With Alcohols, Phenols, Carboxylic Acids, and Acid Anhydrides, Ind. & Eng. Chem., vol. 48, No. 1, Jan. 1956, pp. 86–92.

SAMUEL H. BLECH, *Primary Examiner.*

MURRAY TILLMAN, LEON J. BERCOVITZ,
*Examiners.*

J. C. BLEUTGE, *Assistant Examiner.*